United States Patent [19]

Stumpe

[11] 4,437,504
[45] Mar. 20, 1984

[54] TIRE-PRESSURE REGULATING SYSTEM
[75] Inventor: Werner Stumpe, Kornwestheim, Fed. Rep. of Germany
[73] Assignee: Robert Bosch GmbH, Stuttgart, Fed. Rep. of Germany
[21] Appl. No.: 354,580
[22] Filed: Mar. 4, 1982
[30] Foreign Application Priority Data
Mar. 5, 1981 [DE] Fed. Rep. of Germany ... 8106194[U]
Dec. 9, 1981 [DE] Fed. Rep. of Germany ....... 3148729
[51] Int. Cl.³ .............................................. B60C 29/00
[52] U.S. Cl. ................................. 152/427; 116/34 R; 137/493; 141/46; 152/417
[58] Field of Search ................ 152/415, 416, 417, 427; 141/38, 65, 46; 116/34 R; 137/493

[56] References Cited
U.S. PATENT DOCUMENTS
4,116,245 9/1978 Ayers ............................. 152/415 X
4,313,483 2/1982 Brockmann ......................... 152/416

FOREIGN PATENT DOCUMENTS
2630511 1/1978 Fed. Rep. of Germany .
2736603 2/1979 Fed. Rep. of Germany .
1580240 11/1980 United Kingdom .

Primary Examiner—William A. Powell
Assistant Examiner—Thomas Bokan
Attorney, Agent, or Firm—Edwin E. Greigg

[57] ABSTRACT

A tire-pressure regulating system for motor vehicles is proposed, in which a tire-pressure control valve is provided on each vehicle wheel to be monitored.

The control valve has a valve seat attached to the housing and a closing body arranged to cooperate with this valve seat. The closing body is disposed on a working surface in such a way that a seat valve controlled by working surfaces is created. The control valve is adjustable in accordance with differential pressure with the aid of a throttle valve means. In this way the differential pressure can be established by the tire pressure being directed at that time. Below a minimum permissible filling pressure, the control valve is closed.

The tire-pressure regulating system is preferably applicable to trucks and trailer trucks such as semitrailers to which frequently is attached another wheeled cargo carrier.

12 Claims, 5 Drawing Figures

TIRE-PRESSURE REGULATING SYSTEM

BACKGROUND OF THE INVENTION

The invention is based on a tire-pressure regulating system for automatically regulating the pressure of vehicle tires. A tire-pressure regulating system of this kind is known (German Auslegeschrift No. 27 36 603). In regulating systems of this kind, there is the problem that the tire-pressure control valve, disposed on the vehicle wheel, must be opened both when the tire is filled and when the tire pressure is being reduced, and it cannot assume its closed position until the pressure in the supply line has dropped below 1 bar. Usually, then, the supply line is evacuated whenever the tires are not being filled or whenever the tire pressure is not being reduced, so that the rotor devices which provided a rotary line connection to the wheels are relieved of pressure, in order to attain the lowest possible amount of friction.

A tire-pressure control valve is already known from German Offenlegungsschrift No. 26 30 511, which is embodied as a slide valve. A slide valve of this kind is expensive, inconvenient, bulky and heavy. Its weight and its eccentric disposition on the tire produce a substantial imbalance, which impairs the performance of the tire during vehicle operation. Such a valve also has substantial hysteresis, and it is susceptible to soiling by material worn off from the tire.

OBJECT AND SUMMARY OF THE INVENTION

The tire-pressure regulating system embodying the present invention has the advantage over the prior art that the control valve responds easily at every pressure level; that when it is opened, it is throttled only slightly; that it is very simple in structure; and that it is favorable in cost. Furthermore, it saves space and is convenient to use and very low in weight. Finally, it is failsafe. Because of its low mass, it does not affect tire performance during vehicle operation.

The seat valve is combined with a throttle; it is intended to permit the air, flowing back from the tire when the pressure is being reduced, to flow out via the control valve without the control valve effecting severe throttling and closing prematurely. The throttle produces a pressure difference at a working surface of the seat valve which is utilized as a supplement to adjusting the seat valve; when the supply line is evacuated, this pressure difference comes into full effectiveness.

The invention will be better understood and further objects and advantages thereof will become more apparent from the ensuing detailed description of the preferred embodiments taken in conjunction with the drawings.

DESCRIPTION OF THE PREFERRED EMBODIMENTS

Figure 1:
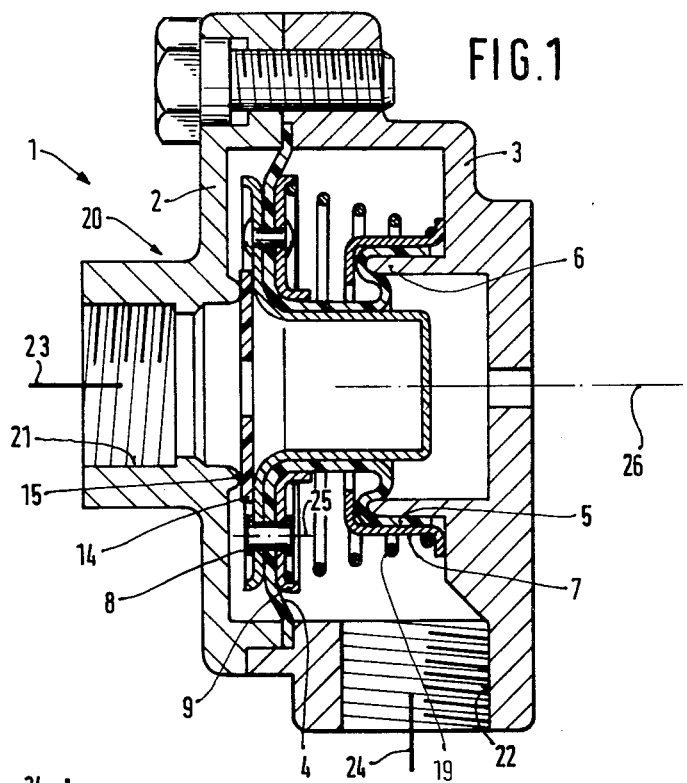
FIG. 1 shows a first structural type of a tire-pressure control valve.

A tire-pressure control valve as shown in FIG. 1 has a two-part housing 1 with a cap 2 and a base 3. A diaphragm 4 is disposed in the housing 1 and is mounted with an inner part 5 over a tubular protrusion 6 of the base 3 and held firmly in place by a spring plate 7, thus embodying a diaphragm/piston member 20.

With the aid of a plurality of rivets, one of which is a hollow rivet 8, a metal disc 9 and a closing body 14 vulcanized on the metal disc 9 are secured on a central area of the diaphragm 4. The closing body 14 is intended to cooperate with a seat 15 connected to the housing. The seat 15 and the closing body 14 comprise a control valve 14/15.

A spring 19 is disposed between the metal disc 9 and the spring plate 7, holding the spring plate 7 firmly on the inner part 5 and supporting the closing body 14 with respect to the base 3.

The cap 2 has a central threaded inlet connection 21, and the base 3 has a lateral threaded outlet connection 22. A supply line 23 leads to the threaded inlet connection 21, and a line 24 leads from the threaded outlet connection 22 to the vehicle tire. One axis 25 of the throttle embodied by the hollow rivet 8 is disposed in the closing body 14 parallel to a coaxial axis 26 of the control valve 14/15.

Mode of Operation of the Control Valve of FIG. 1

The tire-pressure control valve is usually closed. If the pressure in the tires is to be reduced or increased, then the system first directs a pressure increase through the supply line 23 from 0 bar to the desired, new tire pressure. When the increasing pressure exceeds the valve opening pressure of approximately 1 bar, the valve 14/15 opens; a diameter of the valve seat, the diameter of the relief means for the system (not shown) and the force of the spring 19 determine the valve opening pressure.

If the pressure in the tire is to be increased, then air flows out of the supply line 23 via the valve 14/15 to the tire. In the control valve, the diaphragm/piston member 20 has moved to a stop against the base 3, counter to the force of the spring 19.

After the filling process has ended, the control valve closes once again, after the supply pressure has been switched off.

When it is desired to reduce air pressure, the supply line is momentarily placed under pressure to cause the valve 14/15 to open. The supply line is then vented, preferably to the atmosphere, causing air to flow through the opened valve out of the tire. While the air is flowing out, the pressure in the vicinity of the valve seat 15 is always higher than the opening pressure. There is a differential pressure, derived from the medium flowing therethrough, on the working surface of the diaphragm/piston member 20: on one side of the diaphragm/piston member 20, the tire pressure prevails, while on the other or valve side, a throttled pressure prevails which is only slightly lower. This automatically adjusts the valve 14/15 such that a state of equilibrium is established between the tire pressure, the throttled pressure and the pressure at the threaded inlet conection 21. Acting on the valve seat 15, along with the differential pressure at the working surface of the diaphragm/piston member 20 and the force of the spring 19, is a supplementary closing force. This supplementary closing force is attained by means of the differential pressure of the air in consequence of the fact that the effective surface of the diaphragm-piston member is larger in the closing direction of the valve. However, the complete closure of the valve 14/15 does not yet occur, because the pressure in the supply line 23 is still above the opening pressure, and the diaphragm/piston member 20 continues to act counter to the force of the spring 19 until the pressure difference has again been established at the diaphragm/piston member 20. The valve 14/15 closes completely only when the supply line 23 has been fully evacuated.

If the air is blown out of the supply line 23 slowly while the tire pressure is being reduced, then the control valve 14/15 remains fully opened. In the vicinity of the inlet connection 21, the effective pressure is approximately equal to the tire pressure, and this presses the diaphragm/piston member 20 to its stop, counter to the force of the spring 19. When the supply line 23 is rapidly evacuated to zero pressure, a pressure drop is established at the throttle (that is, the hollow rivet 8), and thus the supplementary closing force is exerted upon the valve. The valve 14/15 thus closes.

Figure 2:
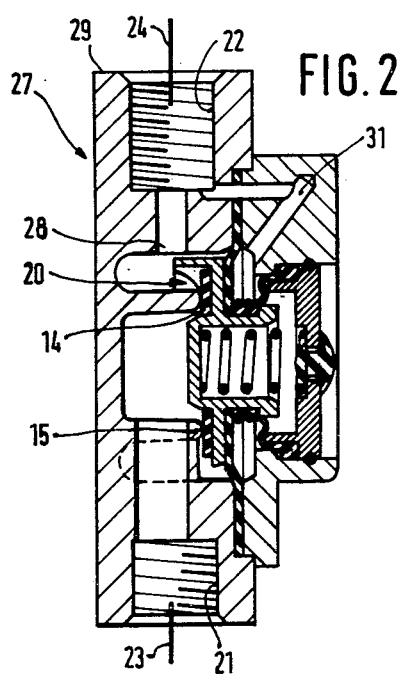
FIGS. 2 and 3 show a different structural type of a tire-pressure control valve.
Figure 3:
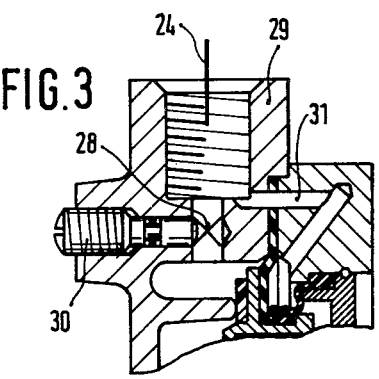

The tire-pressure control valve 27 shown in FIGS. 2 and 3 is similar in structure to that of FIG. 1. For this reason, corresponding elements have the same reference numerals. Its mode of operation is the same as that of the valve shown in FIG. 1. A throttle 28 is provided here in a housing part embodied by a cap 29. The cross section of this throttle 28 is adjustable with the aid of a screw 30. See FIG. 3. Finally, a lateral channel 31 is also provided, protruding into the line 24 which leads to the vehicle tire; bypassing the throttle 28, this lateral conduit 31 connects the vehicle tire with the closing side of the control valve. In this manner, the static pressure and the dynamic pressure are both exerted onto the control valve 27 in the closing direction, and when the supply line 23 is evacuated, the total tire pressure can be exploited to effect a pressureactuated switching of the control valve.

Figure 4:
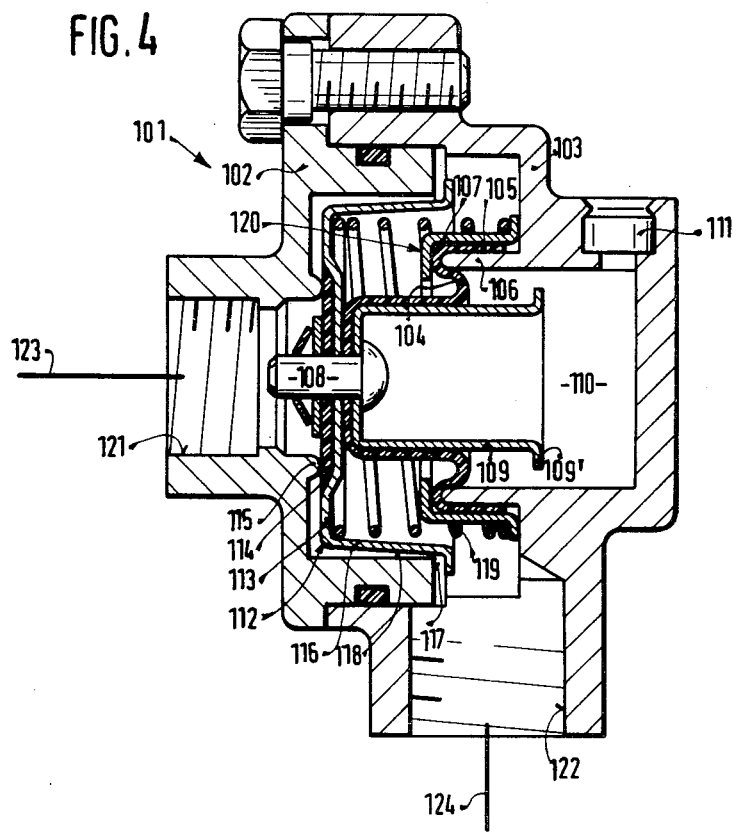
FIGS. 4 and 5 show further variants.
Figure 5:
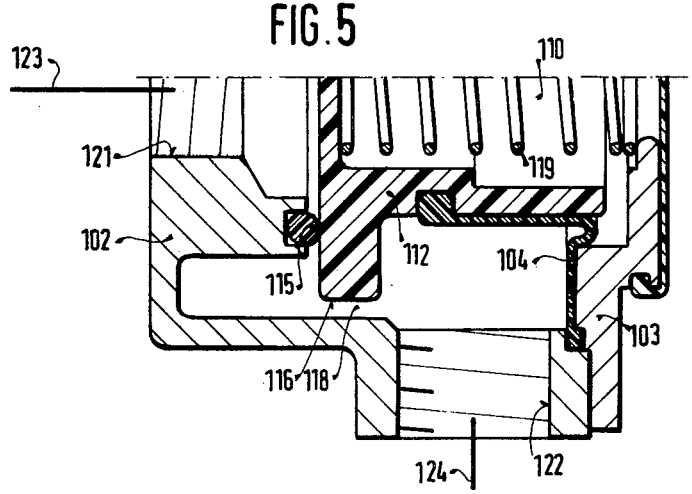

In the exemplary embodiment of a tire-pressure control valve shown in FIGS. 4 and 5, the valve has a two-part housing 101 with a cap 102 and a base 103. A diaphragm 104 is disposed in the housing 101, being drawn with an outer rim 105 over a tubular protrusion 106 of the base 103 and held in place there by a spring plate 107. In this manner, a diaphragm/piston member 120 is created.

A sheath 109 is secured on a central area of the diaphragm 104 with the aid of a rivet 108. The sheath 109 is disposed in an ambient-air space 110, which communicates with the outside air via a filter 111. A sheath rim 109' serves as a stop with respect to an inner wall of the base 103. The same rivet 108 also holds a cup 112 firmly on the diaphragm 104. The base 113 of the cup 112 carries a closing body 114, which is intended for cooperation with a seat 115 connected to the housing. The seat 115 and the closing body 114 comprise a control valve 114/115.

A rim 116 of the cup 112 is embodied as slightly conical; however, it may also be shaped as a cylinder or sphere. It is positioned opposite an inner annular edge 117 of the cap 102 in such a manner that an annular throttling groove 118 is adjustable in cross section or length when there is an axial movement of the cup 112. A spring 119 is disposed between the cup 112 and the spring plate 107, holding the spring plate 107 firmly on the diaphragm 104 and supporting the cup 112 relative to the base 103.

The cap 102 has a threaded inlet connection 121 at its center, and the base 103 has a threaded outlet connection 122 on its side. A supply line 123 leads to the threaded inlet connection 121 and a line 124 leads from the threaded outlet connection 122 to the vehicle tire.

The mode of operation of this structural type is substantially identical to that already described.

In order to reduce the tire pressure, the supply line is again first placed under pressure, so that the valve 114/115 opens. While air is flowing out of the tire, the pressure in the vicinity of the valve seat 115 is always higher than the opening pressure. The annular throttling gap 118 adjusts automatically in cooperation with the valve 114/115, which acts as a further throttle, in such a manner that a state of equilibrium is established between the tire pressure, the throttled pressure, and the pressure at the threaded inlet connection 121. This effect is reinforced by the relatively large diameter of the cup 112, on one side of which the tire pressure prevails and on the valve side of which a smaller, throttled pressure prevails. As a result, a supplementary closing force in addition to that of the spring 119 is exerted in the direction of the valve seat 115. However, the complete closure of the valve 114/115 does not yet take place, because the pressure in the supply line 123 is still above the opening pressure, and the diaphragm/piston member 120 counteracts the force of the spring 119 until the throttled pressures are again in a state of equilibrium. Only after the supply line has been completely evacuated does the valve 114/115 close.

The tire-pressure control valve shown in FIG. 5 is similar in structure to that shown in FIG. 4. Identical elements are therefore identified by identical reference numerals. Its mode of operation is like that of FIG. 4.

The three embodiments of the invention disclosed have one important feature in common. In each one, the throttle 8, 28 or 118, is always in effect during a reduction of tire pressure. The throttle is necessary in order to produce a pressure difference at the closing member of the valve, this pressure being effective when the rotary transmission device (not shown) bridging the air blow gap between the axle and the wheel is made pressure free in order to bring the valve into a closing position. The pressure at the rotary transmission device must be relieved so that it will not close and furthermore will not hinder the rotation of the wheel.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A housed tire-pressure regulating system for varying the tire pressure of motor vehicles, said system having a tire-pressure control valve which is normally closed disposed on the vehicle wheel to be monitored said control valve being operated by a vehicle operator to control tire-pressure variation, characterized in that said tire-pressure control valve includes a seat valve controlled by work surfaces via a piston member having a closing body, said control valve further including a throttle valve means, said throttle valve means arranged to modify a pressure difference of said tire pressure which flows through said control valve, said difference being utilized for pressure-actuation of said seat valve.

2. A tire-pressure regulating system as defined by claim 1, characterized in that said throttle valve means is disposed in a closing body of seat valve.

3. A tire-pressure regulating system as defined by claim 1, characterized in that said throttle valve means is disposed in a cap attached to said housing of said control valve.

4. A tire-pressure regulating system as defined by claim 1 or 3, characterized in that said throttle valve means is variable at least over a portion of the closing stroke of the seat valve.

5. A tire-pressure regulating system as defined by claim 1, characterized in that said housing includes a lateral conduit which communicates the closing side of the control valve with a line leading to said vehicle tire and provides a static-pressure effect on the control valve in a closing direction.

6. A tire-pressure regulating system as defined by claim 1, characterized in that said housing further includes an annular recess with said closing body is arranged to cooperate to provide a throttling means.

7. A tire-pressure regulating system as defined by claim 6, characterized in that said closing body further includes a cup-like member having a base and a contiguous rim, said rim arranged to provide a movable part of said throttling means.

8. A tire-pressure regulating system as defined by claim 7, characterized in that said annular rim tapers away from said base.

9. A tire-pressure regulating system as defined by claim 7 or 8, characterized in that said annular rim is provided in the vicinity of said cup-like base member.

10. A tire-pressure regulating system as defined by claim 1, characterized in that said piston member is exposed to the force of a spring.

11. A tire-pressure regulating system as defined claim 10, characterized in that said piston member has a surface subjected to the tire pressure, and further that the working surface of the closing body subjected to the line pressure and the force of the spring counteracting these pressures are all adapted to one another such that the control valve is closed below the minimum permissible tire pressure.

12. A tire-pressure regulating system as defined by claim 1, characterized in that said throttle valve means has a cross section which is dimensioned such that the quantity flow through said throttle valve means could be greater than is the quantity flow when the tire pressure is being reduced but is smaller than the quantity flow which occurs when the supply line is being evacuated.

* * * * *